J. D. Whelpley,
Friction Gearing.
Nº 53,717.          Patented Apr. 3, 1866.
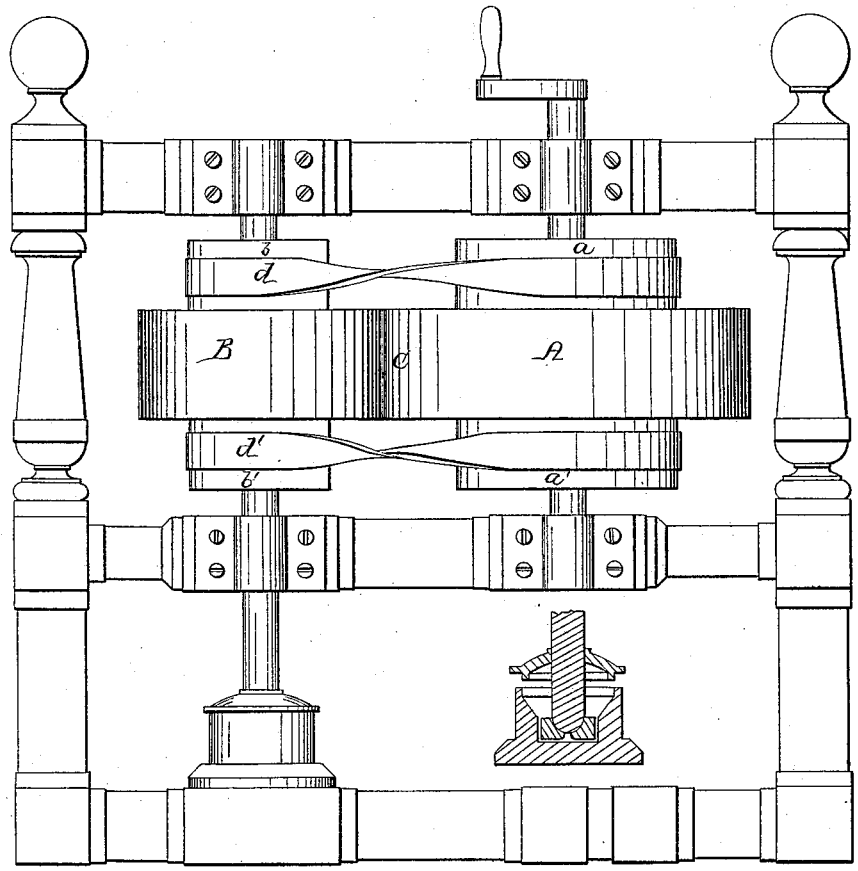
Witnesses:
Thoston Clarke
Charles Bateman
Inventor:
James D. Whelpley

UNITED STATES PATENT OFFICE.

JAMES D. WHELPLEY, OF BOSTON, MASSACHUSETTS.

IMPROVEMENT IN BELTED FRICTION-GEARING.

Specification forming part of Letters Patent No. 53,717, dated April 3, 1866.

*To all whom it may concern:*

Be it known that I, JAMES D. WHELPLEY, of Boston, in the county of Suffolk and State of Massachusetts, have invented a new and useful Belted Friction-Gearing; and I do hereby declare that the following is a full, clear, and exact description of the construction and operation of the same, reference being had to the accompanying drawings, forming a part of this specification, in which—

Figure 1 is an elevation; and Fig. 2, a section of the step or pivot of the shaft of wheel B, Fig. 1.

The purpose of my invention is to enable us to use shorter belting than is commonly needed in connection with pulleys, to lessen the friction on journals where it is necessary to use tight belting and high velocities, and to make use of friction-surfaces in communicating motion from one pulley to another in connection with belts when the pressure required to create sufficient friction is unusually great. I attain these results by the following arrangement: I adjust two pulleys, A and B, with parallel shafting in the usual manner to connect their movements by the friction of their faces; but as the friction, and consequently the driving effect, is greater as the pressure between the two faces in contact is increased, I force the two into contact more strongly by crossed belts $d\ d'$, connecting smaller pulleys $a\ b$ and $a'\ b'$ on the same shafts, and in the manner shown in the drawings.

I conceive the effect of this arrangement to be as follows: It is evident that the belting may be of any degree of tightness without increasing friction on the journals. Notwithstanding the excessive tension of the belts, the two shafts will not be drawn any nearer together, being prevented from approach by the interposed larger friction-gear. Thus, in addition to the advantage of tight belting, the very means that is taken to enable its use serves as a powerful auxiliary in giving motion to the driven pulley.

By placing a friction-roller between the two drums, so that each shall press it, and belting round them both over all, the crossing of the belts may be avoided.

What I claim as my invention, and desire to secure by Letters Patent, is—

The belted friction-gearing consisting of friction-drums A and B, belt-pulleys $a$ and $b$, $a'$ and $b'$, and belts $d\ d'$, arranged, combined, and operated substantially as described, and for the purpose stated.

JAMES D. WHELPLEY.

Witnesses:
THOS. WM. CLARKE,
CHARLES BATEMAN.